United States Patent [19]

August, Jr. et al.

[11] 3,851,607
[45] Dec. 3, 1974

[54] REGENERATOR SUPPORT SYSTEM FOR MARINE GAS TURBINE

[75] Inventors: John L. August, Jr.; Richard T. Cuscino, both of Schenectady, N.Y.

[73] Assignee: General Electric Company, Schenectady, N.Y.

[22] Filed: Mar. 29, 1973

[21] Appl. No.: 345,846

[52] U.S. Cl............................................... 114/.5 R
[51] Int. Cl............................................... B63b 35/00
[58] Field of Search......... 114/.5 R; 248/DIG. 1, 19, 248/55; 165/81; 52/573; 14/16; 115/.5

[56] References Cited
UNITED STATES PATENTS

| | | | |
|---|---|---|---|
| 3,390,854 | 7/1968 | Sherburne | 248/55 |
| 3,612,333 | 10/1971 | Cowles | 114/74 A X |
| 3,710,853 | 1/1973 | Young | 165/81 |

*Primary Examiner*—Trygve M. Blix
*Assistant Examiner*—Stuart M. Goldstein
*Attorney, Agent, or Firm*—Erwin F. Berrier, Jr.

[57] ABSTRACT

In a gas turbine power plant for ship propulsion; exhaust gases are passed through regenerator (recuperator) units, forming part of the exhaust stack, in a heat-exchange relation with compressor discharge air prior to introduction of the compressor air into the combustion cycle. The regenerator units are uniquely supported in the ship's hull; and, according to the present invention, provision is made for thermal expansion and contraction of the regenerator units, and dynamic loads due to ship roll and pitch.

1 Claim, 5 Drawing Figures

REGENERATOR SUPPORT SYSTEM FOR MARINE GAS TURBINE

BACKGROUND OF THE INVENTION

This invention relates to a support system for shipboard heat-exchange units and, in particular, this invention comprises a support system for a regenerator unit used with a marine gas turbine.

In the application of a gas turbine power plant to marine propulsion, it is desirable to include a regenerative cycle to increase the overall thermal efficiency of the power plant. A regenerative cycle unit may have an overall thermal efficiency 30 percent greater than a simple cycle unit. The regenerative cycle unit differs from a simple cycle unit, in that, a heat exchanger (regenerator) forms part of the hot exhaust path. Compressor discharge air is passed through the regenerator in a heat exchange relation with the hot exhaust gases; and, therefore, is heated before it is fed into the combustion chambers. The regenerator raises the compressor discharge air temperature reducing the amount of fuel required to bring the combustion gases to the required operating temperature.

Regenerator units, suitable for a marine gas turbine, are mounted either directly above or to the side of the gas turbine in the exhaust gas flow path. Application of a regenerative cycle to a marine propulsion power plant requires taking into account the shape of the ship's hull and/or cargo space to minimize engine room space requirements.

The regenerator is a large, box-like heat exchanger having closed circuit air passageways parallel to and contiguous with a number of hot exhaust gas channels. A regenerator unit may weigh as much as the gas turbine itself. Moreover, the rigid construction must be permitted to expand and contract thermally.

Although the regenerator unit is a relatively massive structure, it must be securely anchored to the ship structure due to the dynamic forces induced by the roll and pitch of the ship. Moreover, sometimes the restricted availability of space requires that the regenerator be mounted in a non-horizontal position.

SUMMARY OF THE INVENTION

A regenerator support system for a marine gas turbine power plant includes a number of regenerator support platforms, fixed to the ship's structure or hull, and arranged so that thermal movement may be permitted along both the longitudinal and lateral axes of the regenerator unit. Each platform includes a pair of parallel rails along the direction of anticipated thermal motion. Each regenerator unit includes a plurality of footings, each footing also including a pair of parallel rails respectively keyed to and slidable with a platform parallel rails. The slidable relation between each respective support platform and footing and the novel arrangement of the support platforms accommodates thermal movement. Dynamic loadings are accounted for by means of bushings having bolts therethrough which permit the sliding relation between each respective support platform and regenerator footing while preventing uplift between each support platform and regenerator footing.

OBJECTS OF THE INVENTION

It is an object of the present invention to provide a support system for a heat-exchange unit for a marine power plant which permits thermal movement of heat-exchange unit while permitting uplift of the unit from the ship's structure.

Other objects, advantages and features of the present invention will become apparent from the following description of a preferred embodiment thereof when taken in connection with the accompanying drawings.

DETAILED DESCRIPTION OF THE INVENTION

Figure 1:
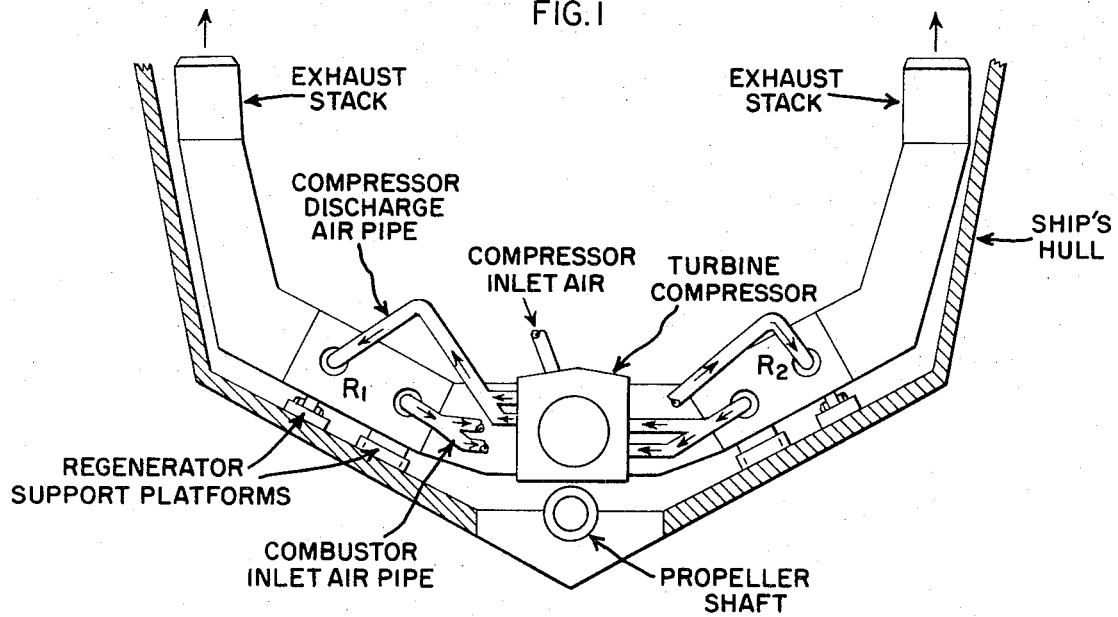
FIG. 1 is a cross section of a ship's hull showing an arrangement of a marine gas turbine power plant and with arrows indicating a regenerative cycle air flow path.

Referring to FIG. 1, a ship's hull includes a marine turbine power plant having a turbine-compressor portion which drives a ship's propeller; and, an exhaust system including an exhaust plenum and exhaust duct (divided into two separate stacks) and a pair of regenerator units $R_1$ and $R_2$ each forming part of an exhaust stack. This is one arrangement of a marine turbine power plant and is illustrative only, as other configurations are available for which applicants' invention may be useful.

The regenerative cycle includes compressor discharge air (compressor inlet air processed through the compressor) which is passed via a compressor discharge air pipe to a regenerator section (identical piping into each side of gas turbine) where it passes through the regenerator in a counterflow manner to the exhaust gas. The compressor air is heated by the exhaust gas within the regenerator and is then passed via a combustor inlet air pipe to the combustion chambers to be utilized in the combustion cycle. Again, this is only one embodiment of numerous regenerative cycle arrangements which may be utilized.

Figure 2:
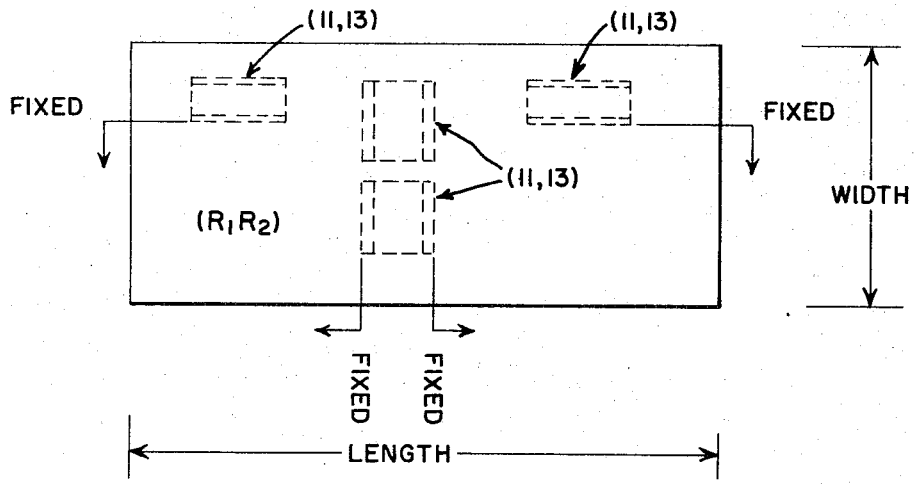
FIG. 2 is a diagrammatic plan view of a single regenerator showing one embodiment of the support system.

FIG. 2 illustrates one aspect of applicants' invention, i.e., a regenerator support system. The system comprises a number of regenerator support platforms, to which, respective regenerator footings are keyed so that the regenerator may move, under thermal stressing, in either direction along the length of the regenerator from a fixed plane as illustrated. Likewise, the regenerator may expand along the width from a fixed plane as illustrated. This is possible because the regenerator footings are relatively slidable with respect to their regenerator support platforms as hereinafter described. This is indicated in FIG. 2 by the lines showing fixed positions and arrows showing the direction of thermal growth. This arrangement is again merely illustrative as it will depend on the orientation and position of the regenerator and the availability of support points.

Figure 3:
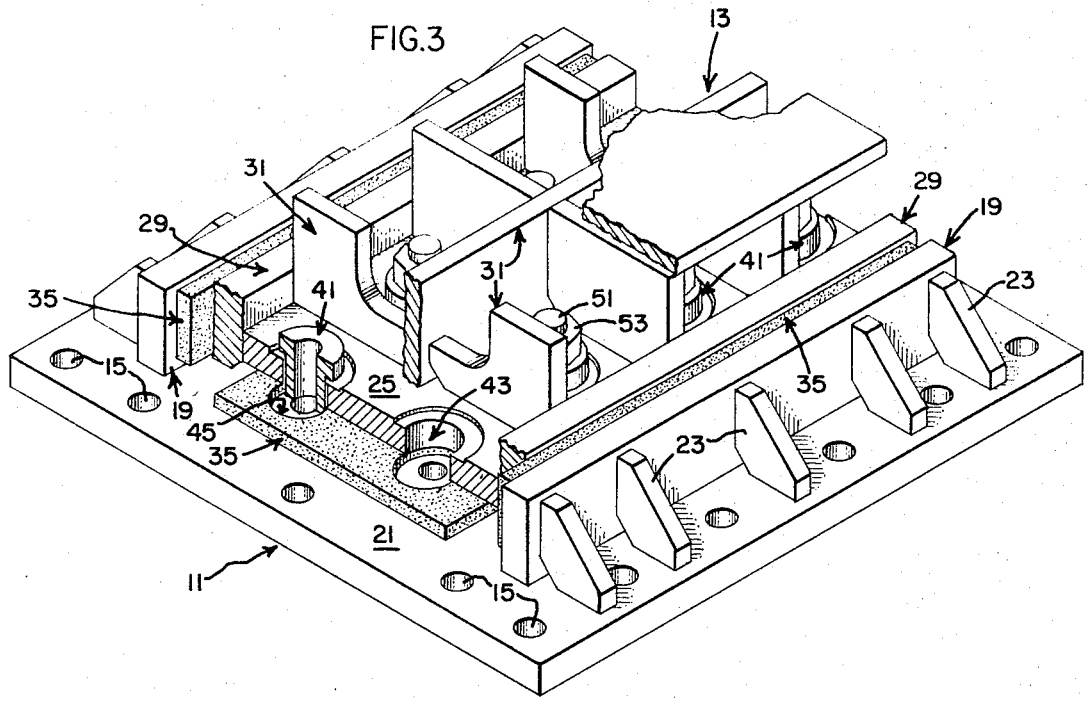
FIG. 3 is an isometric view of a regenerator support platform and a portion of a regenerator footing (cross-sectional) according to the present invention.
Figure 4:
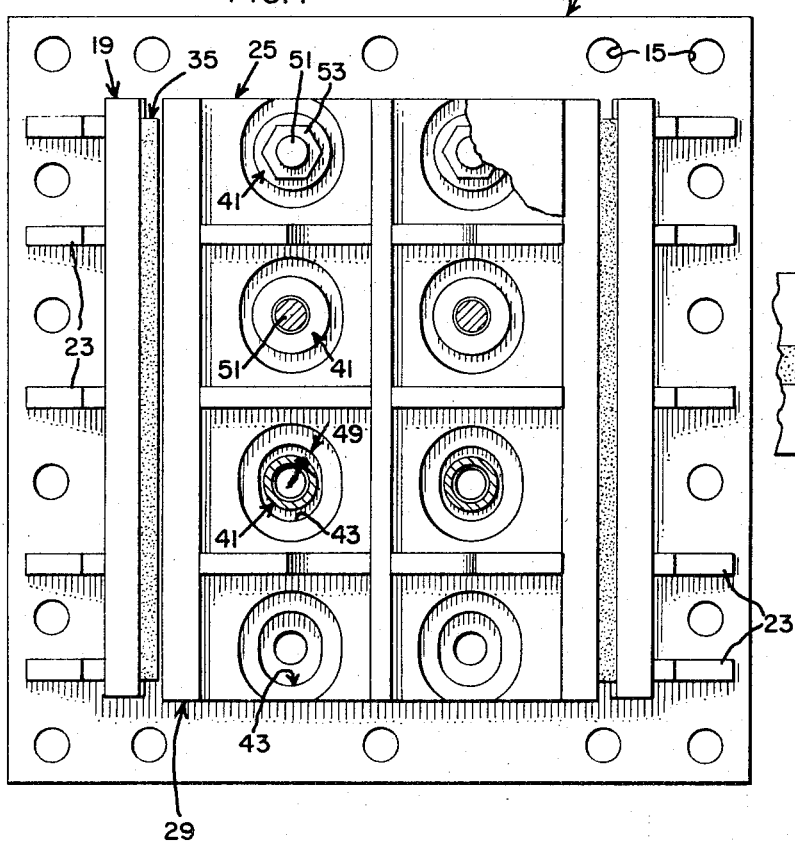
FIG. 4 is a plan view of a single regenerator support platform and also includes a portion of a regenerator footing mounted thereon.
Figure 5:
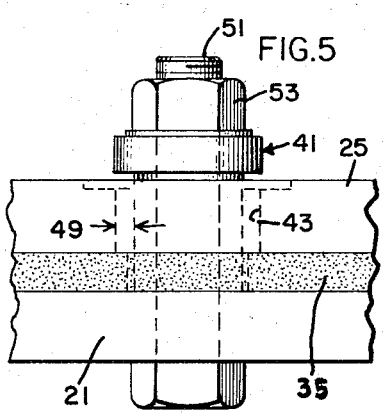
FIG. 5 is an elevation view of a single bolt-bushing of the type used to slidably fix the regenerator footing to the regenerator support platform.

FIGS. 3, 4 and 5 show a second aspect of the applicants' invention, i.e., the regenerator support platform 11 and a portion of a keyed regenerator footing 13 (parts shown in cross section). The regenerator support platform 11 is fixed, according to one embodiment of the present invention, to the interior sides of the ship's hull through bolt holes 15. A pair of fixed parallel rails 19 extend from a fixed plate 21 forming the regenerator support and thermal guide platform. The rails are appropriately braced by angle supports 23.

The regenerator footing 13 shown in cross section includes a slidable plate 25 to which there is fixed a pair of slidable parallel rails or surfaces 29, one on each side of the slidable plate 25. These rails are machined to provide a clearance so that sliding can occur relative to fixed rails 19. The footing further includes support legs 31 attached to the slidable plate 25 and fixed to the regenerator (not shown). Self-lubricated slide pads 35 are positioned between the fixed and slidable parallel rails, and the fixed and slidable parallel plates respectively. The self-lubricated pad may be Lubrite, a trademark of Merriman, Inc. It is therefore obvious that sliding movement is permitted between the regenerator support platform and the regenerator footing along the direction of the parallel rails.

The regenerator footing, slidable within the support platform guide rails, must be prevented from uplifting from the support platform under the influence of dynamic forces induced by pitch and roll. This is accomplished by inserting bushings 41 through holes 43 and 45 respectively formed in the slidable plate and self-lubricated pad. As is apparent in FIGS. 4 and 5, a clearance 49 is formed between the outer circumference of the bushing stem and the hole 43 to permit sliding movement of the regenerator due to thermal forces, whereas a bushing flange overlies the respective holes 43. This clearance, 49, is established relative to the thermal movement of the regenerator. In addition slight clearances are provided between the slidable parallel rails and the self-lubricated pads as well as between the bushing flange and the slidable plate. Since the slidable plate is free to move, the regenerator unit is free to expand and contract thermally. Uplifting of the regenerator is prevented by contact between the slidable plate and the bushing flange, and the bushing is tightly held to the fixed plate by threaded bolt 51 and nut 53. It will be thus appreciated that while the clearance 49 permits sliding movement due to thermal stressing, the bushing 41 will also prevent uplift of the regenerator due to dynamic forces.

The operation of the invention includes two aspects; i.e., the support system and each support. Reviewing FIG. 2, a preferred embodiment, the support platforms and footings (11, 13) are arranged in two mutually perpendicular pairs. One pair includes rails directed along the length of the regenerator allowing thermal expansion and contraction in that direction. The other pair of support platforms and footings include parallel rails directed along the width of the regenerator permitted thermal expansion and contraction in that direction. However, the support platforms also provide mutually perpendicular fixed support planes from which thermal movement is permitted as indicated in FIG. 2.

Referring to FIGS. 3, 4 and 5, dynamic loads are prevented from uplifting the regenerator footings from the support platforms by bushings 41 and threaded bolts 51 whereas sliding due to thermal movement is permitted because of clearance 49 between the bushing and hole 43 in the slide plate. Also, clearances between the slidable parallel rails and the self-lubricating pads permit sliding movement.

While there is shown what is considered to be, at present, the preferred embodiment of the invention, it is, of course, understood that various other modifications may be made therein and it is intended to cover in the appended claims all such modifications as fall within the true spirit and scope of the invention.

What is claimed is:

1. A system for attaching a marine turbine powerplant regenerator having longitudinal and transverse axes to a ship's hull, said system comprising:

at least three support platforms, each support platform including a fixed plate having a substantially flat upper surface and a pair of spaced rails extending from said upper surface, said rails having elongated inner parallel surfaces which extend at right angles from said plate upper surface so as to form an elongated, generally U-shaped channel, at least two of said platforms being fixedly secured to the hull of said ship with said platform inner rail surfaces extending along one of said regenerator axes and at least one of said platforms being fixedly secured to the hull of said ship with said platform inner rail surfaces extending along the other of said regenerators axes;

a regenerator footing for each support platform, each regenerator footing including a slidable plate having a substantially flat bottom surface and a pair of spaced rails secured to opposed sides of said slidable plate, said footing rails having outwardly facing elongated parallel surfaces extending at right angles to said footing plate bottom surface, each said footing fixedly secured to said regenerator so as to extend into the U-shaped channel of its respective support platform and sized so that said footing parallel surfaces are in close sliding relationship to said platform rail surfaces;

each said footing plate formed with a plurality of apertures extending therethrough, a bushing for each said aperture, each said bushing having a stem portion and a flange portion at one end of said stem portion, the stem portion of each bushing extending through said footing plate and secured to said support plate, said stem and flange portions sized so that the flange extends beyond said aperture in close spaced relationship to the upper surface of said slidable plate, each said aperture being elongated along the axis of its respective parallel rail surfaces so as to permit relative movement along such axis between each support platform and its respective footing.

* * * * *